United States Patent
Bättig

[19]

[11] Patent Number: 6,155,720
[45] Date of Patent: Dec. 5, 2000

[54] JOURNAL BEARING

[75] Inventor: Josef Bättig, Egliswil, Switzerland

[73] Assignee: Asea Brown Boveri AG, Baden, Switzerland

[21] Appl. No.: 09/360,645

[22] Filed: Jul. 26, 1999

[30] Foreign Application Priority Data

Jul. 29, 1998 [DE] Germany .............................. 198 34 111

[51] Int. Cl.[7] ................................................ F16C 27/04
[52] U.S. Cl. ............................................................ 384/99
[58] Field of Search ............................ 384/99, 215, 537, 384/584, 581, 535

[56] References Cited

U.S. PATENT DOCUMENTS

| | | | |
|---|---|---|---|
| 3,159,435 | 12/1964 | Schlick | 384/215 |
| 3,170,736 | 2/1965 | Wright | 384/215 |
| 3,844,630 | 10/1974 | Lechner | 384/99 |
| 3,950,964 | 4/1976 | Alexeeva et al. | |
| 4,440,456 | 4/1984 | Klusman | 384/99 X |
| 4,872,767 | 10/1989 | Knapp | 384/99 |
| 5,425,584 | 6/1995 | Ide | 384/99 |
| 5,803,612 | 8/1998 | Battig | 384/99 |

FOREIGN PATENT DOCUMENTS

| | | |
|---|---|---|
| 6605193 | 4/1967 | Germany . |
| 2264605 | 8/1974 | Germany . |
| 3609618A1 | 10/1986 | Germany . |
| 19613471A1 | 10/1997 | Germany . |

*Primary Examiner*—Thomas R. Hannon
*Attorney, Agent, or Firm*—Burns, Doane, Swecker & Mathis, L.L.P.

[57] ABSTRACT

The invention relates to a journal bearing for the shafts of high-speed rotors, and provides simple, and therefore low-cost, centering of squeeze film dampers for high-speed rotors, with improved long-term behavior, less installation space requirements and adequate concentricity accuracy. A centering element divides the annular gap into two partial annular gaps, with the bearing housing being configured in at least two parts and with a first bearing housing part bounding the first partial annular gap radially toward the outside and a second bearing housing part bounding the second partial annular gap radially toward the outside.

9 Claims, 3 Drawing Sheets

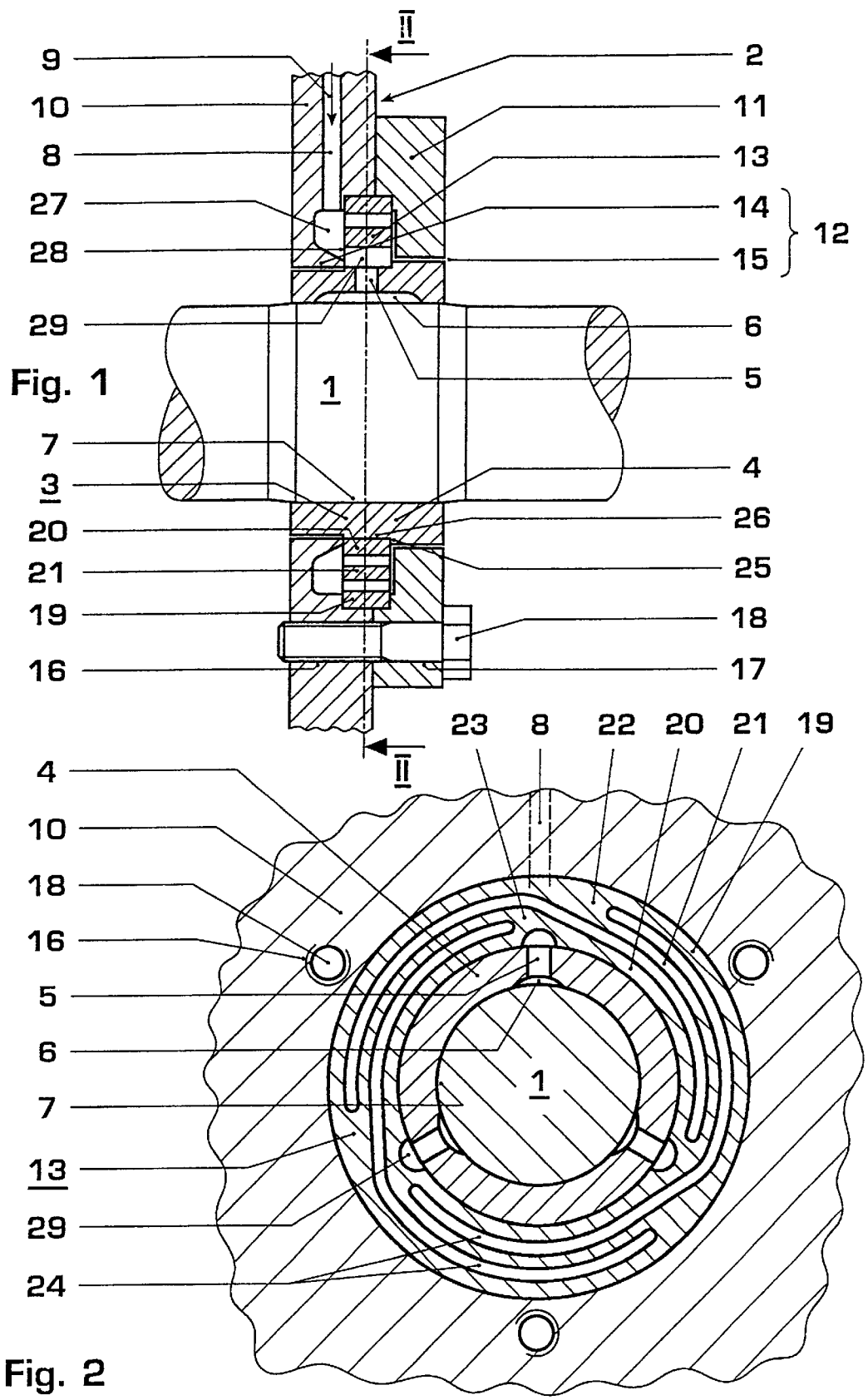

JOURNAL BEARING

BACKGROUND OF THE INVENTION

1. Field of the Invention

The invention relates to a journal bearing for the shafts of high-speed rotors.

2. Discussion of Background

Large axial and radial forces act on high-speed rotors, such as the shafts of turbochargers, and these forces are accepted by appropriately configured and arranged thrust bearings and journal bearings. In addition, it is also necessary to provide compensation for the radial rotor vibrations if troublefree operation is to be ensured. For this purpose, so-called squeeze film dampers which reduce the amplitude of the rotor vibrations occurring are employed in turbomachines. Such a squeeze film damper consists essentially of an annular gap configured between a bearing sleeve and a bearing housing and connected to an oil supply. Because the bearing sleeve is also supported by a hydrodynamic lubricating film on the shaft side, it is often also referred to as a floating sleeve. In the case of nonrotating floating sleeves, the problem arises—particularly in the case of heavy rotors—that the floating sleeve is not centered during operation. It is, rather, positioned in the lower region of the bore which accommodates it. This leads, on the one hand, to poorer damping properties and, on the other, to wear of the corresponding components.

Numerous possibilities for centering a squeeze film damper are known to avoid these disadvantages (see article "Application of Squeeze Film Dampers", by F. Y. Zeidan, in Turbomachinery International, September/October 1995, p. 51, FIG. 2–4). These are O-ring centering arrangements in the axial region of the squeeze film damper, centering being by means of a lateral spring rod cage and by means of leaf springs arranged radially and locally at the periphery. A further squeeze film damper centering arrangement by means of bending rods arranged radially at the outside is known from the article "Linear Force Coefficients for Squeeze-Film Dampers", by A. Z. Seri et al in Transactions of the ASME, p. 326, Vol. 105, July 1983.

A disadvantageous feature of O-ring centering, however, is that this has a nonlinear spring characteristic and unsatisfactory long-term behavior whereas, in the case of the spring rod cage, a very large amount of axial installation space is necessary. On the other hand, the bending rods require a large amount of radial space and, because of the large number of individual parts, involve high costs and unsatisfactory concentricity accuracy. The leaf spring solution, which likewise requires a large amount of radial space, can only be manufactured by the electrical discharge machining method. In this case, furthermore, there is danger of shaft-side deformation of the bearing sleeve.

Wear-free centering elements for centrifugal machines with a vertical shaft arrangement have been known, as such, for a long time (U.S. Pat. No. 3,950,964) but have not been employed up to now for the centering of squeeze film dampers and have not been used in the case of turbomachines and their high-speed rotors.

SUMMARY OF THE INVENTION

The invention attempts to avoid all these disadvantages. Accordingly, one object of the invention is to provide simple, and therefore low-cost, centering of squeeze film dampers for high-speed rotors, with improved long-term behavior, less installation space requirements and sufficiently accurate concentricity.

In accordance with the invention, this is achieved in an appliance as described in the preamble to claim 1, wherein the centering element divides the annular gap into two separate partial annular gaps. The bearing housing is configured in at least two parts. A first bearing housing part bounds the first partial annular gap radially toward the outside and a second bearing housing part bounds the second partial annular gap radially toward the outside.

Because of the subdivision of the previously known squeeze film damper into two partial annular gaps, two separate squeeze film dampers are now available over the axial length of the bearing sleeve or of the journal bearing, the centering of which squeeze film dampers can be clearly improved by the centering element arranged between them. This leads to an increase in the damping properties, i.e. to improved compensation of the radial rotor vibrations and, on the other hand, to a reduction in the wear of the adjacent components.

It is particularly advantageous for the centering element to be arranged at least approximately in the middle between the two partial annular gaps. By this means, tipping of the bearing sleeve under radial load can be prevented.

It is, in addition, desirable to employ a centering element which is configured in one piece in the radial direction and has a linear spring characteristic. This permits realization of a wear-free centering element with a defined linear spring stiffness. A centering element which consists of an outer ring, an inner ring and a plurality of bending rods has been found to be particularly suitable. In this arrangement, each bending rod has rod ends permanently connected to the outer ring and the inner ring and each bending rod is separated in the radial direction from the outer ring and the inner ring by a respective peripheral slot. Such an annular centering element requires relatively little installation space both axially and radially and can be manufactured from one workpiece by means of electrical discharge machining or can be produced by the precision casting process.

During the operation of a high-speed turbomachine equipped with a journal bearing in accordance with the invention, the bearing housing and the outer ring of the centering element remain in their specified position. In contrast, the bending rods, and with them the inner ring, can move relatively freely within the limits specified by the material of the centering element so that the bearing sleeve, and therefore finally the shaft of the turbomachine, can be displaced as desired in the bearing housing in both the axial and radial directions within certain limits. In this way, automatic centering of the squeeze film damper, and therefore of the shaft, is achieved so that continuous adaptation is possible to the operating conditions which arise.

It is also advantageous for the rod ends of the bending rods to be configured so that they become continuously thicker in the direction of the outer ring or inner ring connected to them. The stresses at the rod ends, i.e. notch effects and bending stresses, can be reduced by this means.

As an alternative to a centering element equipped with bending rods, it is also possible to use a centering element provided with a cardan ring. Respective peripheral slots are then formed both between the cardan ring and the outer ring and between the cardan ring and the inner ring. The cardan ring is connected to the outer ring and to the inner ring by means of two inner and two outer webs which interrupt the respective peripheral slots. An advantageous effect which is similar to that obtained when a centering element equipped with bending rods is used can, in principle, be achieved by such a solution. Somewhat more radial installation space is, however, required for this arrangement.

The centering element can be configured as a separate component or as a constituent part of the bearing housing or the bearing sleeve. In deciding on one of these variants, it is necessary to strike a balance between the manufacturing costs and the accuracy necessary.

It is particularly desirable for the two partial annular gaps to be sealed toward the outside so that the squeeze film damper has relatively low oil consumption. The damping function is, of course, also ensured without sealing elements.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein several embodiment examples of the invention are presented, using the journal bearing for the shaft of an exhaust-gas turbocharger, and wherein:

FIG. 1 shows a partial longitudinal section in the region of the journal bearing;

FIG. 2 shows a section through the bearing housing along the line II—II in FIG. 1;

DESCRIPTION OF THE PREFERRED EMBODIMENTS

Figure 3:
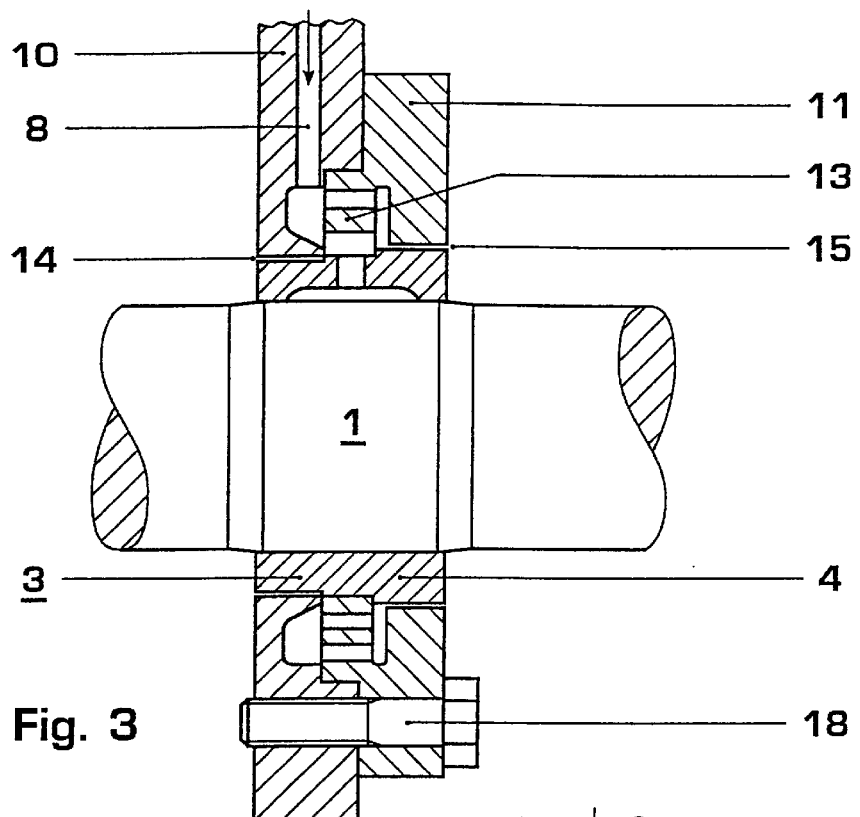
FIG. 3 shows a representation in accordance with FIG. 1 but in a second embodiment example.

Referring now to the drawings, wherein like reference numerals designate identical or corresponding parts throughout the several views, where the flow direction of the working medium is indicated by arrows and where only the elements essential to understanding the invention are shown (not shown, for example, are the compressor and the turbine of the exhaust gas turbocharger), the exhaust gas turbocharger consists essentially of a rotor with a compressor impeller, a turbine wheel and a common shaft 1 and includes a compressor casing, a turbine casing and bearing housings 2 at the compressor end and turbine end respectively. The bearing arrangement for the shaft 1 has, at both the compressor end and the turbine end, journal bearings 3, which mainly consist of a bearing sleeve 4, a supply hole 5 penetrating the latter, a bearing pocket 6 and a bearing gap 7 in each case. The journal bearings 3 are each connected to a supply hole 8, for lubricating oil 9, arranged in the bearing housing 2. A partial longitudinal section in the region of the journal bearing 3 arranged at the compressor end of an exhaust gas turbocharger is shown in FIG. 1.

The bearing housing 2 consists of a first bearing housing part 10, which accommodates the supply hole 8, and a second bearing housing part 11, configured as a housing cover. A squeeze film damper 12, configured as an annular gap, is arranged between the bearing housing 2 and the bearing sleeve 4. The annular gap 12 is divided into two partial annular gaps 14, 15 in its axial region by a centering element 13 arranged approximately in the middle, the first bearing housing part 10 bounding the first partial annular gap 14 radially toward the outside and the housing cover 11 bounding the second partial annular gap 15 radially toward the outside. A threaded hole 16 is arranged in the first bearing housing part 10 and a hole 17 corresponding to the threaded hole 16 is arranged in the housing cover 11, this hole 17 accommodating a corresponding connecting bolt 18 for the releasable housing cover 11.

In a first embodiment example, the centering element 13 consists of an outer ring 19, an inner ring 20 and three bending rods 21, each bending rod 21 having rod ends 22, 23 permanently connected to the outer ring 19 and the inner ring 20 and each bending rod being separated in the radial direction from the outer ring and the inner rings 19, 20 by a peripheral slot 24 (FIG. 2). The bending rods 21 have a uniform rod thickness over the whole of their length. The rod ends 22, 23 of the bending rods 21 can also, of course, be advantageously configured so that they become continuously thicker in the direction of the outer ring or inner ring 19, 20 connected to them (not shown).

The manufacture of the centering element 13 can take place from one workpiece by electrical discharge machining. Given a correspondingly large slot width of the peripheral slots 24, the centering element 13 can also be advantageously realized by precision casting. For certain embodiment variants, the centering element 13 can also, of course, be arranged to be eccentric to the annular gap 12 so that the two partial annular gaps 14, 15 have a different axial extent. It is also possible to use a different number of bending rods 21. It is likewise possible to arrange a plurality of centering elements 13 axially adjacent to one another or to use an axially divided centering element 13 (not shown).

As shown in FIG. 1, the centering element 13 is configured as a separate component. For assembly reasons, the bearing sleeve 4 is equipped with three different external diameters so that a defined accommodation region 26 provided with a stop 25 is produced for the centering element 13. Before the assembly of the bearing sleeve 4, the annular centering element 13 is pressed, onto the accommodation region 26 provided, and as far as the stop 25 so that there is a non-positive connection. The centering element 13, and therefore also the bearing sleeve 4, are then pressed into the first bearing housing part 10 and finally fastened to the housing cover 11. The bearing sleeve 4 can also, of course, be provided with a uniform external diameter, positive fastening of the centering element 13 being possible in this case.

During operation of the exhaust gas turbocharger, the shaft 1 and the journal bearing 3 accommodating it are subjected to different axial and radial forces corresponding to the particular operating situation. In addition, varying radial rotor vibrations occur for which compensation is provided by the squeeze film damper 12. During this process, the centering element 13, which has a linear spring characteristic and is configured in one piece in the radial direction, undertakes the centering of the bearing sleeve 4 and therefore of the squeeze film damper 12. In this way, contact between the bearing sleeve 4 and either the first bearing housing part 10 or the housing cover 11 can be avoided. For the functioning of the centering element 13, it is then of particular importance that no type of relative motion should take place between the bearing sleeve 4 and the inner ring 20 of the centering element 13. The forces occurring are, rather, accepted by the bending rods 21 which can move freely within certain limits in both the axial and radial directions. Although the bearing housing 2 and the outer ring 19 of the centering element 13 are stationary, the shaft 1, the bearing sleeve 4 and the inner ring of the centering element 13 can therefore adapt to suit the particular operating condition of the exhaust gas turbocharger, i.e.

they can be displaced as required. Tipping of the bearing sleeve 4 under radial load can be prevented because of the arrangement of the centering element 13 in the middle of the annular gap 12.

The supply of lubricating oil 9 to the squeeze film damper 12, i.e. to the first and second partial annular gaps 14, 15, takes place via the supply hole 8 connected to an oil container (not shown). For this purpose, the supply hole 8 terminates at its radially inner end in an annular groove 27 which has an opening 28 leading to an axial groove 29 of the centering element 13. Such an axial groove 29 is arranged in the inner ring 20 in the region of the inner rod end 23 of each of the bending rods 21. In consequence, the lubricating oil 9 reaches the squeeze film damper 12 via the axial grooves 29. Finally, the axial grooves 29 are also connected to the bearing gap 7 via the supply holes 5 penetrating the bearing sleeve 4 and the bearing pocket 6 so that they simultaneously serve as the lubricating oil supply for the journal bearing 3.

In a second embodiment example, the centering element 13 is integrated into the housing cover 11 (FIG. 3). For the same functioning as in the first embodiment example, the number of components used is reduced in this solution and, furthermore, assembly is simplified. The centering element 13 can also, of course, be a constituent part of the first bearing housing part 10 or the bearing sleeve 4 (not shown). In this case, its assembly takes place jointly with the respective component.

Figure 4:
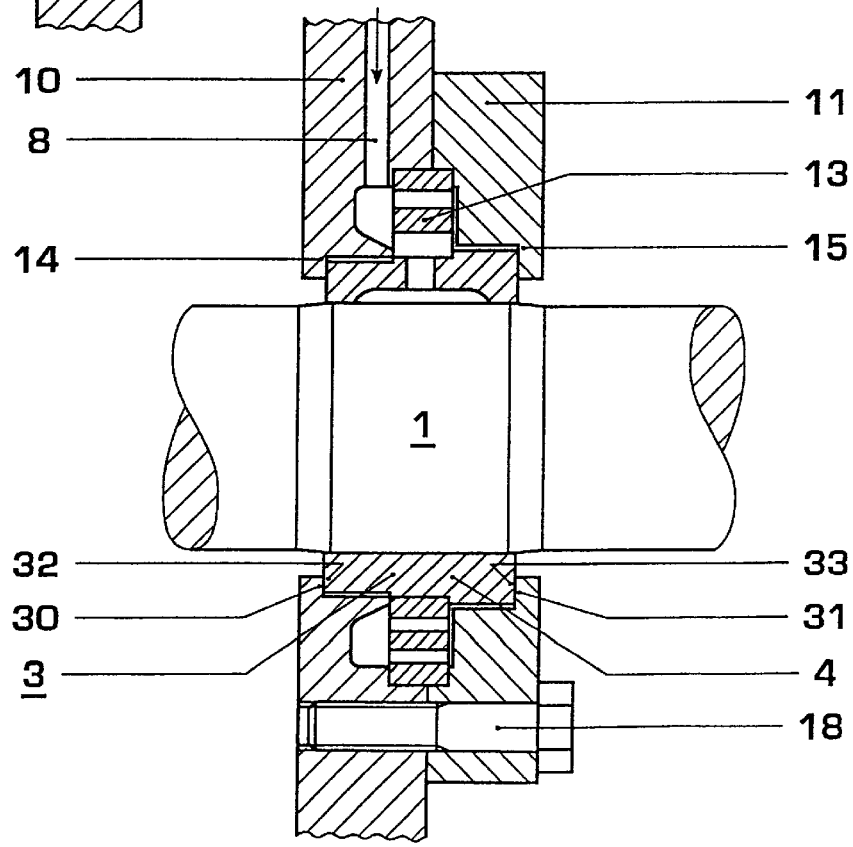
FIG. 4 shows a representation in accordance with FIG. 1 but in a third embodiment example.

In accordance with a third embodiment example, both the first bearing housing part 10 and the housing cover 11 overlap the bearing sleeve 4 axially and each form, on both sides, an accurately fitting housing shoulder 30, 31 for a corresponding shoulder 32, 33 of the bearing sleeve 4 (FIG. 4). In this way, the two partial annular gaps 14, 15 are sealed toward the outside so that the squeeze film damper 12 does not continuously lose lubricating oil 9 to the regions of the shaft 1 outside the journal bearing 3. In this way, the functioning of the squeeze film damper 12 can be stabilized and the oil quantity used for damping purposes can be reduced while maintaining the operating principle of the centering element 13.

Figures 5, 6:
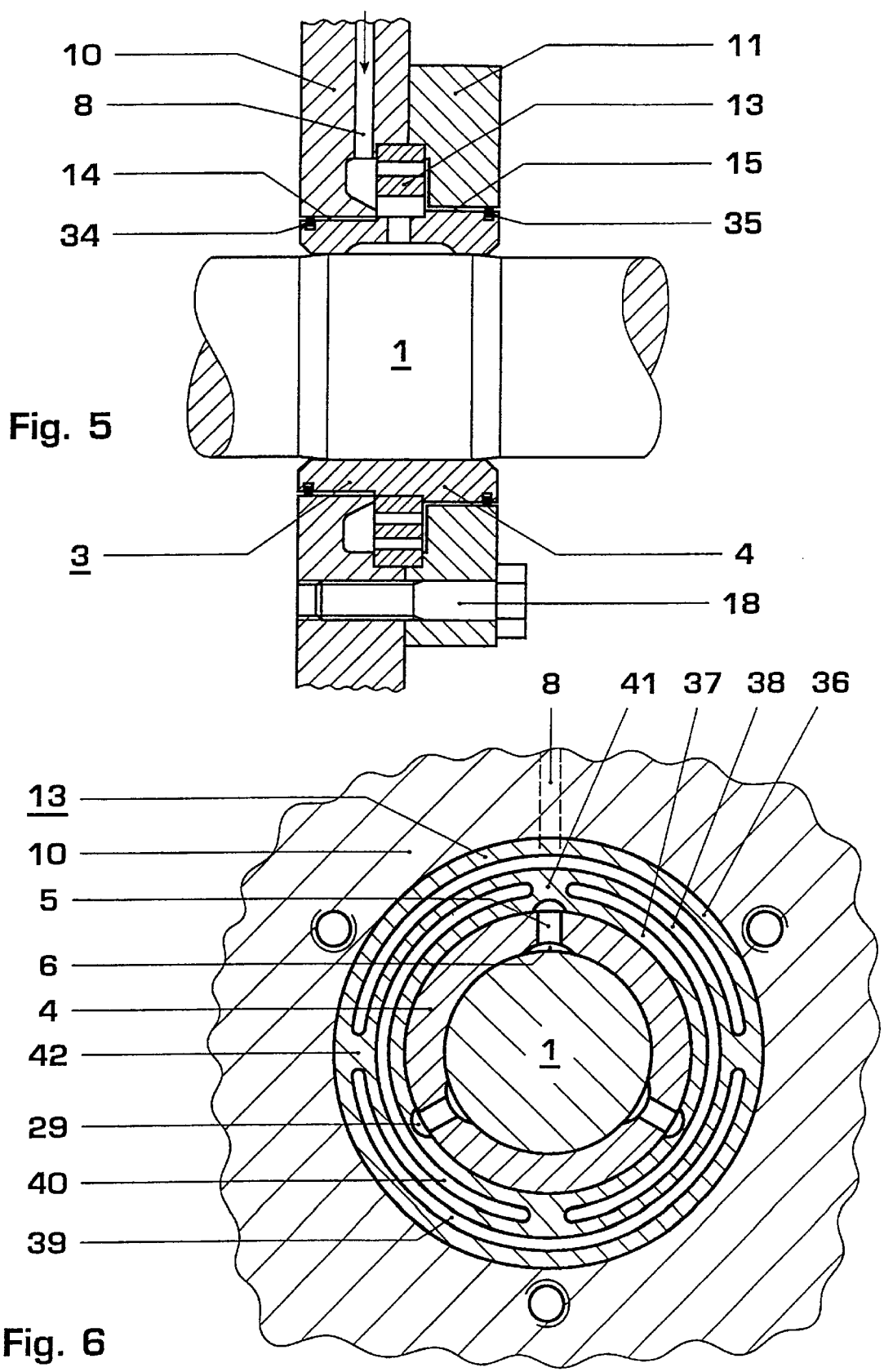
FIG. 5 shows a representation in accordance with FIG. 1 but in a fourth embodiment example.
FIG. 6 shows a representation in accordance with FIG. 2 but in a further embodiment example.

In a fourth embodiment example, annular sealing elements 34, 35 are respectively arranged in both the first and second partial annular gaps 14, 15 (FIG. 5). The two sealing elements 34, 35 essentially undertake the same function as the housing shoulders 30, 31 in the embodiment example previously described.

In a further embodiment example, the centering element consists of an outer ring 36, an inner ring 37 and a cardan ring 38. Peripheral slots 39, 40 are respectively configured both between the cardan ring 38 and the outer ring 36 and between the cardan ring 38 and the inner ring 37. The cardan ring 38 is connected to the inner ring 37 and the outer ring 36 by means of two inner and two outer webs 41, 42 which interrupt the respective peripheral slot 40, 39 (FIG. 6). This alternative solution has substantially the same effect as the first embodiment example and can be particularly applied in cases where an increased axial stiffness of the centering element 13 is necessary.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United State is:

1. A journal bearing for the shafts of high-speed rotors, the journal bearing having a bearing sleeve and a bearing housing, and having a squeeze film damper, the journal bearing comprising: an annular gap connected to an oil supply and configured between the bearing sleeve and the bearing housing of the journal bearing and which has a centering element arranged in the axial region of the squeeze film damper, wherein the centering element divides the annular gap into two partial annular gaps, with the bearing housing being configured in at least two parts and with a first bearing housing part bounding the first partial annular gap radially toward the outside and a second bearing housing part bounding the second partial annular gap radially toward the outside.

2. The journal bearing as claimed in claim 1, wherein the centering element is arranged at least approximately in the middle between the two partial annular gaps.

3. The journal bearing as claimed in claim 1, wherein the centering element has a linear spring characteristic and is configured in one part in the radial direction.

4. The journal bearing as claimed in claim 3, wherein the centering element includes an outer ring, an inner ring and a plurality of bending rods, each bending rod having rod ends permanently connected to the outer ring and the inner ring and each bending rod being separated in the radial direction from the outer ring and the inner ring by a respective peripheral slot.

5. The journal bearing as claimed in claim 4, wherein the rod ends of the bending rods are configured so that they become continuously thicker in the direction of the outer ring or inner ring, 20) connected to them.

6. The journal bearing as claimed in claim 3, wherein the centering element includes an outer ring, an inner ring and a cardan ring, respective peripheral slots being formed both between the cardan ring and the outer ring and between the cardan ring and the inner ring, the cardan ring being connected to the outer ring and to the inner ring by means of two inner and two outer webs which interrupt the respective peripheral slots.

7. The journal bearing as claimed in claim 1, wherein the centering element is configured as a separate component or else as a constituent part of the first bearing housing part, of the second bearing housing part or of the bearing sleeve.

8. The journal bearing as claimed in claim 1, wherein both the first and the second bearing housing parts have a housing shoulder adjacent to the respective partial annular gap and each of the two housing shoulders are in sealing contact with a corresponding shoulder of the bearing sleeve.

9. The journal bearing as claimed in claim 1, wherein a sealing element is arranged in both the first and the second partial annular gaps.

\* \* \* \* \*